Feb. 15, 1927.

M. POISSANT

TART SEPARATING DEVICE

Filed Feb. 23, 1926

1,617,649

INVENTOR.
Mary Poissant
BY
ATTORNEY

Patented Feb. 15, 1927.

1,617,649

UNITED STATES PATENT OFFICE.

MARY POISSANT, OF LITTLE FALLS, MINNESOTA.

TART-SEPARATING DEVICE.

Application filed February 23, 1926. Serial No. 89,832.

This invention relates to improvements in dividers or cutting devices, particularly to a cake or pie cutting device adapted to cut sector-shaped pieces from substantially circular cakes or pies, and it is the principal object of the invention to provide a device of this kind which allows the cutting of symmetrical pieces and the convenient handling of the same.

Another object of the invention is the provision of a device of this type which is simple in its construction, durable and effectively operating.

A further object of the invention is the provision of a device of this kind having a cover provided with a sector-shaped opening allowing an inspection of the cake and the placing of advertisements, etc., on the margins formed by said opening, and equipped with a hinged bottom facilitating the handling of the cut-off piece of cake.

A still further object of the invention is the provision of a hinge-lock for locking frame, cover and bottom with a cut-off piece of cake to allow a ready handling of the same.

These and other objects and advantages of the invention will become more fully apparent as the description thereof proceeds, and will then be more specifically defined in the appended claims.

Figure 1:
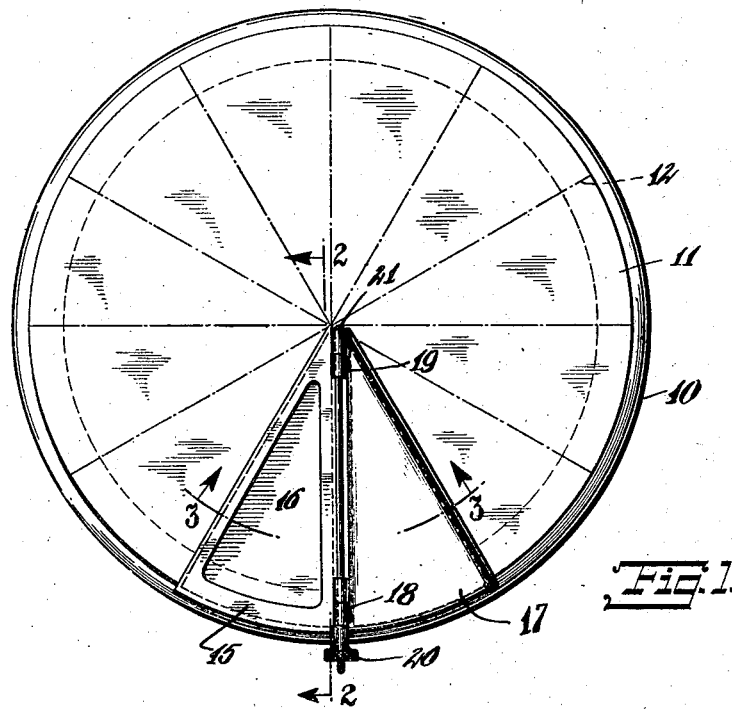
Fig. 1 is a top plan view of a cake on a plate with the device constructed according to the present invention in operative position.
Figure 2:
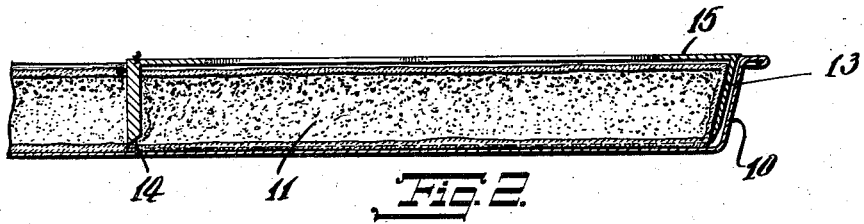
Fig. 2 is a section on line 2—2 of Figure 1.
Figure 3:
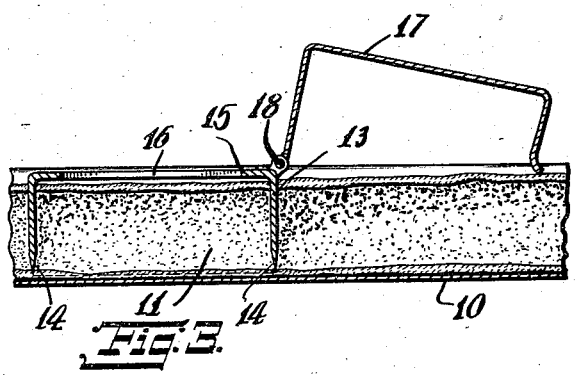
Fig. 3 is a section on line 3—3 of Figure 1.
Figure 4:
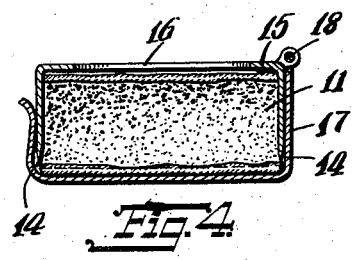
Fig. 4 is a sectional end view of the device, closed.

A tray or plate 10 adapted to support a cake, pie or the like 11, intended to be cut into a plurality of sector-shaped pieces indicated by the broken lines 12, has preferably circular shape, and the device constructed according to the present invention co-operates with said plate as will be described herebelow.

The device can be cheaply manufactured of metal or other suitable material adapted to make it hygienic and allowing a ready cleaning of the same, and consists of a plate, 13, substantially inverted U-shaped in cross section and open at the bottom. The side walls of the plate end at their lower edges into sharp cutting members 14 converging towards the rear to cut sector-shaped parts from the circular cake. The side walls of the frame support a cover 15 having a median opening 16 so that lateral margins are formed adapted to receive proper and suitable inscriptions such as advertisements for instance, and the median opening allows a ready inspection of the cake, to facilitate selection. To the U-plate a bottom 17 is hingedly attached as at 18 and 19 respectively which has substantially U-shape in cross-section however with the opening of the U directed in a direction opposite to the opening of the U-plate. The outer projecting and threaded end of the hinge pintle carries a nut, 20, while the opposite end of of the pintle is formed into a head 21 in order to allow a tight clamping of the parts with the bottom of the device under the cut off piece of cake or to permit a ready removal of the cut-off piece from the plate.

It will be clear that the knife edges will readily cut a sector shaped piece from the cake when pressed into the same against the bottom plate 10, and the piece cut off can conveniently be removed from the cake endwise, whereafter the cover or bottom 17 is swung about the plate to cover the bottom of the cut-off piece and allow a ready packing and transporting of the same.

It is to be understood that the device can be made in any suitable size and may also be made adjustable to any particular size of cake to allow readily the cutting off of sector-shaped pieces and the carrying of the same while suitable advertising matter may be placed on its margins. Other changes such as fall within the scope of the appended claims may be made in the construction and arrangement of parts without departure from the spirit of the invention.

Having thus described my invention, what I claim as new and desire to secure by Letters Patent is:

1. A cake and pie divider comprising a substantially triangular inverted cup having an opening in the top thereof, converging side elements on said cup, knife blades on said side elements, and a triangular cover hinged to said inverted cup adapted to be disposed thereover.

2. A cake and pie divider comprising a substantially triangular inverted container having an opening in the bottom thereof, converging sides on said container cutting edges provided on said sides, a cover hinged on said container comprising a triangular bottom member and converging sides said sides being adapted to be disposed adjacent the outer surface of the converging side of said container, and means comprising a thumb screw for securing said cover in closed relation to said container.

3. Cake and pie dividers comprising a plate, said plate being substantially U-shaped in cross-section and its side walls converging to a common line, cutting edges formed at the lower edges of the walls of said plate, said plate having an inspection opening forming margins on the top thereof for the placing of advertisements, a bottom hinged to said plate adapted to enclose a piece of cake cut off, and a hinge lock for allowing a locking of the bottom to said plate to permit a ready removal and transportation of the same.

4. Cake and pie dividers of the class described, comprising a substantially U-shaped frame having its opening directed downwardly, knife edges formed on the lower edges of said plate adapted to cut sector shaped pieces out of a circular cake, a cover for said plate hinged thereto at one side thereof adapted to be swung about its pivot to form a casing for the cut off piece of cake and a hinge lock for locking the cover in closed relation to said plate.

In testimony whereof I have affixed my signature.

MARY POISSANT.